(12) United States Patent
Culpepper et al.

(10) Patent No.: US 7,451,596 B2
(45) Date of Patent: Nov. 18, 2008

(54) MULTIPLE DEGREE OF FREEDOM MICRO ELECTRO-MECHANICAL SYSTEM POSITIONER AND ACTUATOR

(75) Inventors: Martin L. Culpepper, Marblehead, MA (US); Shih-Chi Chen, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 702 days.

(21) Appl. No.: 11/037,866

(22) Filed: Jan. 18, 2005

(65) Prior Publication Data
US 2006/0156722 A1    Jul. 20, 2006

(51) Int. Cl.
    *F01B 29/10* (2006.01)
(52) U.S. Cl. .......................... 60/527; 60/528; 310/306; 310/309
(58) Field of Classification Search ........... 60/527–529; 310/306–309; 359/290–291
    See application file for complete search history.

(56) References Cited

U.S. PATENT DOCUMENTS

| | | | |
|---|---|---|---|
| 2,923,555 A | | 2/1960 | Kost et al. |
| 3,648,999 A | | 3/1972 | Bauer |
| 4,225,264 A | | 9/1980 | Coone |
| 4,700,932 A | | 10/1987 | Katsuno |
| 4,860,864 A | | 8/1989 | Cwyeyshyn et al. |
| 4,954,789 A | * | 9/1990 | Sampsell ..................... 359/318 |
| 5,083,757 A | | 1/1992 | Barsky |
| 5,086,901 A | | 2/1992 | Petronis et al. |
| 5,678,944 A | | 10/1997 | Slocum et al. |
| 5,769,554 A | | 6/1998 | Slocum |
| 6,069,415 A | | 5/2000 | Little et al. |
| 6,193,430 B1 | | 2/2001 | Culpepper |
| 6,275,325 B1 | * | 8/2001 | Sinclair ..................... 359/291 |
| 6,366,414 B1 | * | 4/2002 | Aksyuk et al. .............. 359/822 |
| 6,647,164 B1 | * | 11/2003 | Weaver et al. ................ 385/16 |
| 6,679,055 B1 | * | 1/2004 | Ellis ............................ 60/527 |
| 6,745,567 B1 | * | 6/2004 | Mercanzini .................. 60/527 |
| 6,746,172 B2 | | 6/2004 | Culpepper |
| 7,046,411 B1 | * | 5/2006 | Fleming ..................... 359/224 |

OTHER PUBLICATIONS

U.S. Appl. No. 10/175,415, filed Jun. 19, 2002, Culpepper.
U.S. Appl. No. 09/293,442, filed Apr. 16, 1999, Culpepper.
Hale, "Principles and Techniques For Designing Preceision Machines" PhD. Thesis, MIT, Cambridge, MA pp. 183 and 184, 229-233, (1999).

(Continued)

Primary Examiner—Hoang M Nguyen
(74) Attorney, Agent, or Firm—Sampson & Associates, P.C.

(57) ABSTRACT

A micro electro-mechanical system (MEMS) positioner, including an actuator and method for making the same, includes a stage formed within a first layer of semiconductor material, along with a series of beams, flexure hinges and controlled input thermal actuators. The actuators are operatively engaged with a second layer, and are selectively actuatable to effect longitudinal expansion thereof, so that relative actuation between individual ones of actuators spaced in the planar direction relative to one another is configured to generate controlled movement of the stage within the planar direction, and relative actuation between individual ones of actuators spaced orthogonally to the planar direction relative to one another is configured to generate controlled movement of the stage out of the planar direction. The relative position between the stage and the support is adjustable in each of six degrees of freedom, so that the compliant mechanism forms a quasi-static precision manipulator.

48 Claims, 15 Drawing Sheets

OTHER PUBLICATIONS

Elmustafa et al., Flexural-Hinge Guided Motion Nanopositioner Stage For Precision Machining :Finite Element Simulations: Precision Engineering;Journal Of The International Societies For Precision Engineering And Nanotechnology, 2001, vol. 25, pp. 77-81.

Ryu et al., Optimal Design Of A Flexure Hinge Based XYO Wafer Stage; Precision Engineering, 1997, vol. 21, pp. 18-28.

Jokiel Jr., et al., Planar and Spatial Three-Degree-Of-Freedom Micro-Stages In Silicon MEMS, Proceedings of the 16th Annual ASPE Conference, Crystal City, VA, Nov. 2001(4 pages).

Dagalakis, et al., Kinematic Modeling And Analysis Of A Planar Micro-Positioner, Proceedings of the 16th Annual ASPE Conference, Crystal City, VA., Nov. 2001 (4 Pages).

Furutani, et al., Nanometer Cutting Machine Employing Parallel Mechanism, Proceedings of the 16th Annual ASPE Conference, Crystal City, VA., Nov. 2001 (4 Pages).

Dagalakis, et al., Kinematic Modeling Of A 6 Degree Of Freedom Tri-Stage Micro-Positioner, (4 pages), undated.

Que, et al., Bent-Beam Electro-Thermal Actuators For High Force Applications, pp. 31-36, IEEE 1999.

Culpepper, et al., Compliant Mechanisms For Micro-Scale Spatial Manipulators: Applications in Nanomanipulation, (4 Pgs,.

Brochure-M-850 Hexapod 6-Axis Parallel Kinematics Robot, 2002 Product Catalogue, Physik Instrument, pp. 1-3.

Brochure-F-206 Six Axis Parallel Kinematics Positioning System, 2002 Product Catalogue, Physik Instrument, pp. 1-5.

\* cited by examiner

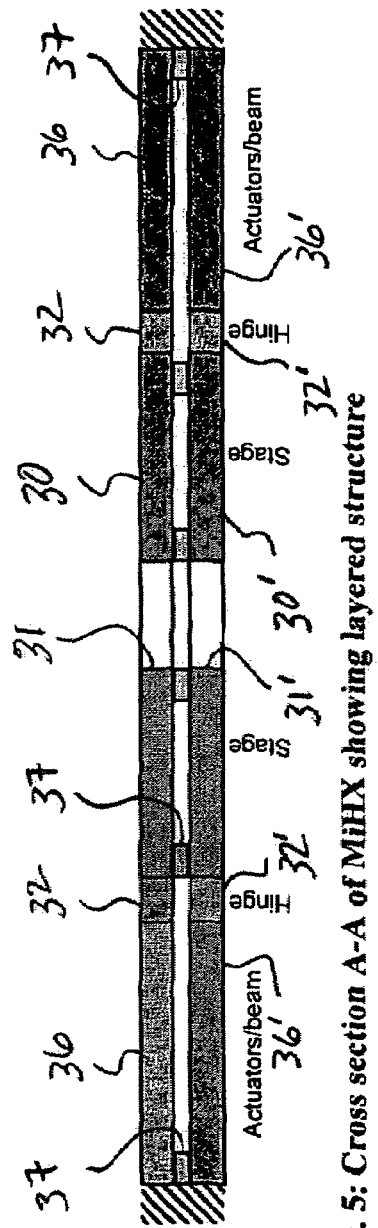
Fig. 5: Cross section A-A of MiHX showing layered structure
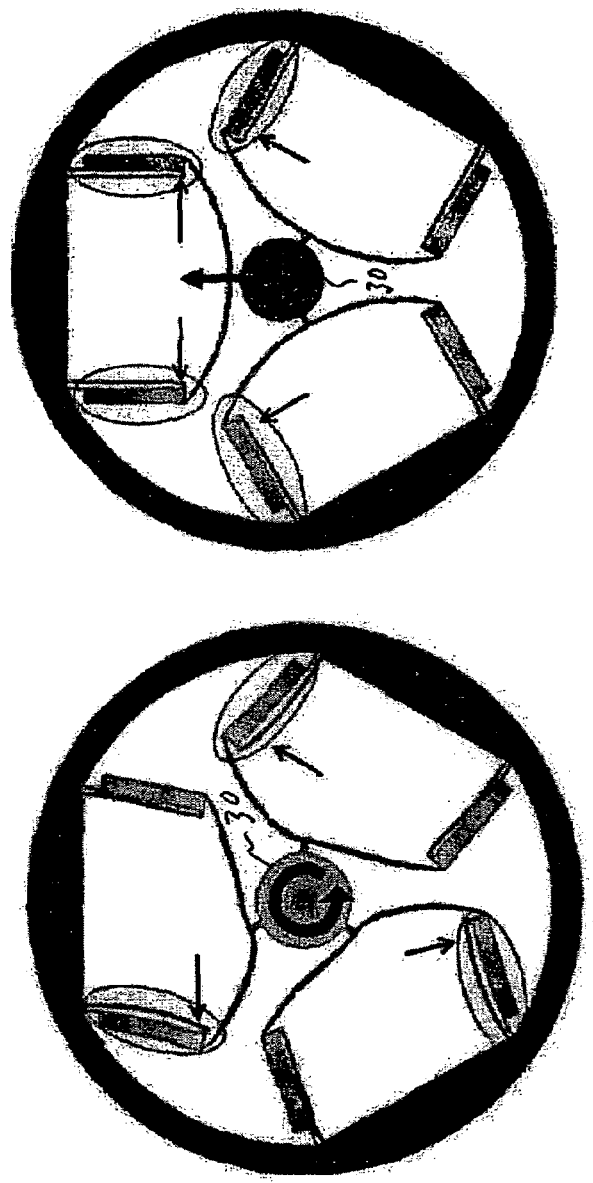
Fig. 6 (a) Rotation around Z-axis
Fig. 6 (b) Displacement along Y-axis

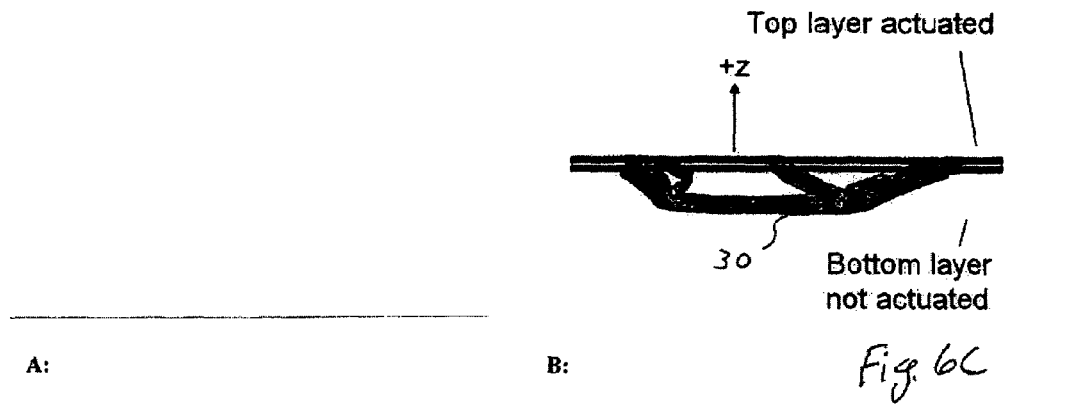
Fig. 6C
Figure 1: Cross section A-A of MiHX showing layered structure
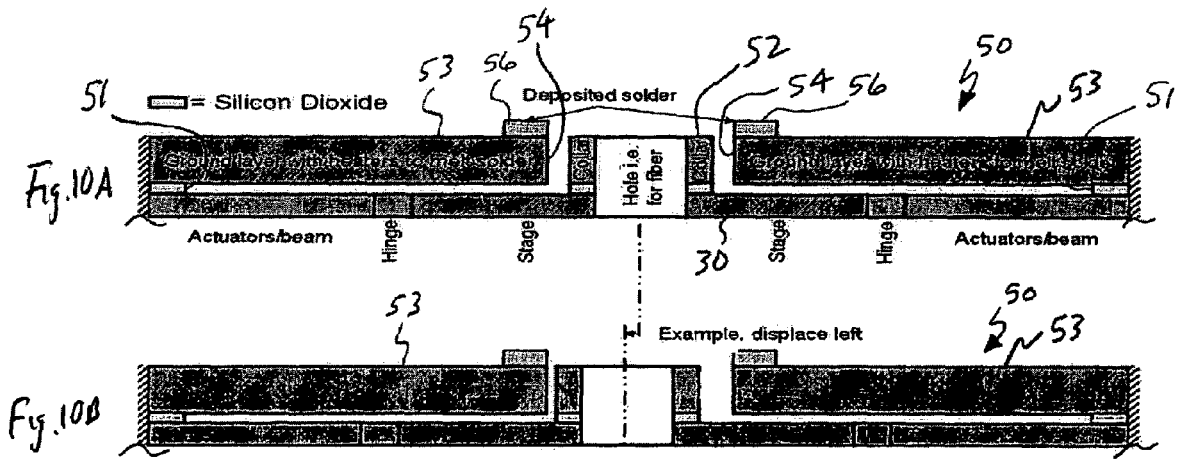
Figure 2: Step 1 and Step 2
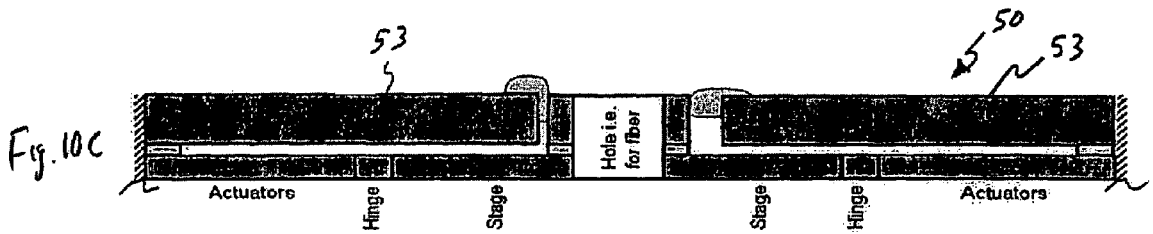
Figure 3: Step 3 to step 6

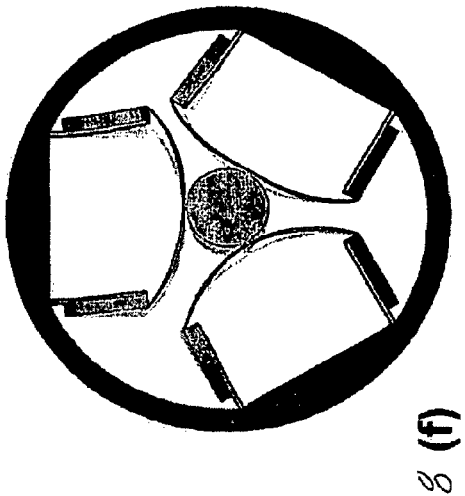
Fig. 8 (f)
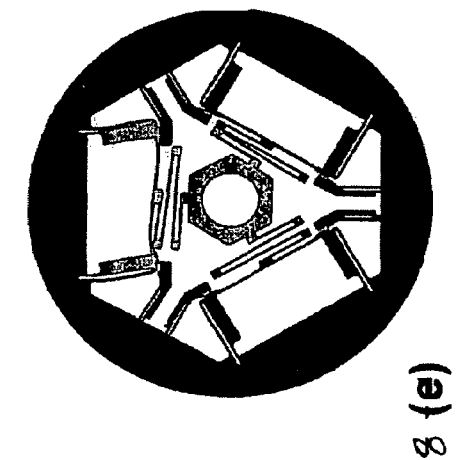
Fig. 8 (e)
| Compliant Flexures Comparison Table | | | | | | |
|---|---|---|---|---|---|---|
| Type | (a) | (b) | (c) | (d) | (e) | (f) |
| Max Disp in X [microns] | 2.10 | 0.87 | 0.80 | 0.80 | 0.92 | 1.30 |
| Max Disp in center [microns] | 0.10 | 0.47 | 0.46 | 0.50 | 0.59 | 0.82 |
| Transmission Ratio | 0.05 | 0.54 | 0.57 | 0.63 | 0.64 | 0.68 |
Fig. 9

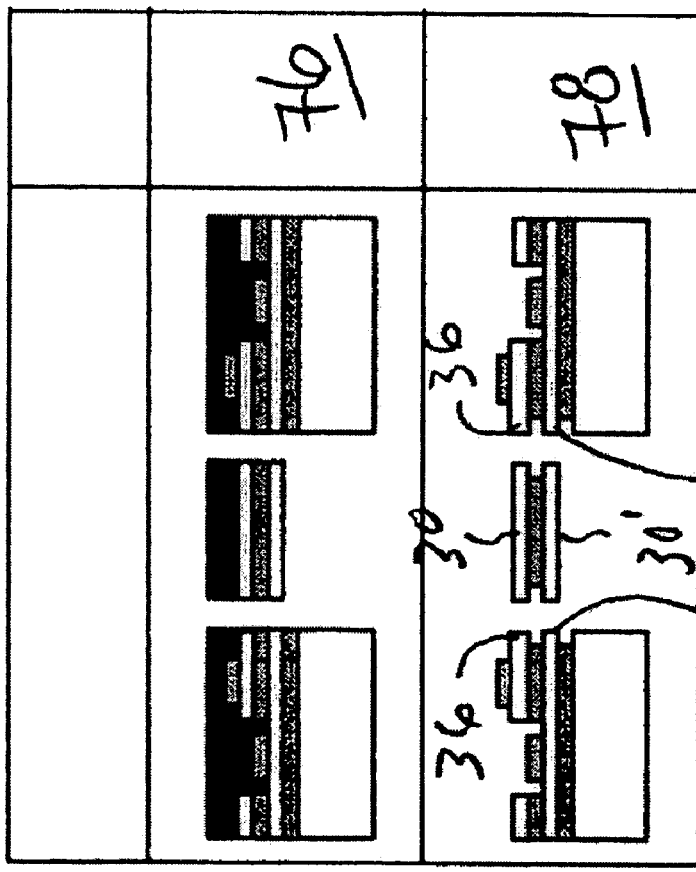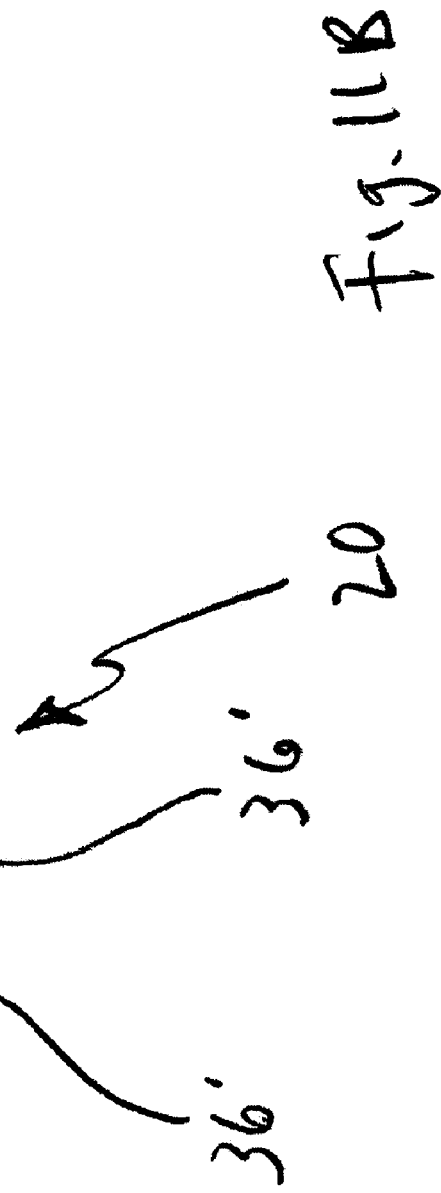
Fig. 11B

Ground

Test Results: Straight vs. Contoured Beam

| Geometry | Straight beam | Contour shaping optimized beam |
|---|---|---|
| Max Stress [N/m$^2$] (von Mises) | 1.56x10$^8$ | 2.32x10$^8$ |
| Displacement [um] | 5.1 | 10.9 |
| Consumed Power [W] | 0.2 | 0.18 |
| Time Constant [s] (Time to reach 90% of 680K) | 0.278 | 0.136 |

Fig. 14

MULTIPLE DEGREE OF FREEDOM MICRO ELECTRO-MECHANICAL SYSTEM POSITIONER AND ACTUATOR

This application is related to U.S. patent application Ser. No. 10/175,415, filed on Jun. 19, 2002, entitled "Six Degree of Freedom Flexure Stage".

BACKGROUND OF THE INVENTION (1) Field of the Invention

The present invention relates generally to a MEMS (Micro Electro-Mechanical Systems) device, and more particularly, to a micro-scale alignment device capable of repeatedly aligning a stage portion relative to a support structure with a relatively high degree of accuracy and precision with up to six degrees of freedom.

(2) Background Information

There is a growing need for fine motion control and positioning at micro and nano scales, such as for the growing number of MEMS applications, including active alignment of fiber optic elements, x-y stages with nanometer level resolution, and machine elements for micro-scale machinery. Also, micro-mirrors, micro-resonators, and manipulation for bio molecules . . . etc will require multi-axis nano and micro-positioners.

Culpepper, in U.S. patent application Ser. No. 10/175,415, filed on Jun. 19, 2002, entitled "Six Degree of Freedom Flexure Stage", (the '415 reference') which is fully incorporated herein by reference, discloses an adjustable monolithic compliant mechanism. This compliant mechanism includes a stage which may be adjusted by displacing one or more tabs coupled thereto, to provide for controlled movement in six degrees of freedom.

Next generation applications (e.g., fiber optic alignment, optical switching, and the like) will require precision alignment devices capable of being fabricated on a micro- or nano-scale, e.g., as MEMS devices fabricated on a chip-level using many conventional semiconductor fabrication techniques, and which are capable of providing high resolution (i.e., nanometer/microradian) position control with six degrees of freedom (i.e., x, y, z, $\theta_x$, $\theta_y$, and $\theta_z$).

Indeed, as shown in FIG. 1, a lateral misalignment as small as 0.001 mm have been shown to generate insertion losses in fiber optics of 1 dB. Likewise, angular misalignment as small as 0.001 rad (0.057 degree) may result in more than 1 dB loss. Unfortunately, conventional alignment devices typically require actuation along at least three mutually orthogonal axes in order to generate movement with six degrees of freedom. Such actuation, however, does not lend itself to the planar structures typically associated with semiconductor fabrication and MEMS devices. Therefore there exists a need for a micro-scale alignment device configured for fabrication using micro-scale wafer fabrication techniques.

SUMMARY OF THE INVENTION

One aspect of the present invention includes a micro electro-mechanical system (MEMS) positioner which includes a stage within a first layer of semiconductor material. The first layer also includes a series of beams, a series of first flexure hinges coupled to the stage and to the beams, and a plurality of first controlled input thermal actuators extending longitudinally therein. The first actuators are coupled to the first beams at spaced locations thereon. A second stage extends in a planar direction within a second layer of semiconductor material. The second layer also includes a series of second beams, a series of second flexure hinges coupled to the second stage and to the second beams, and a series of second controlled input thermal actuators extending longitudinally therein. The second actuators are coupled to the second beams at spaced locations thereon. The first layer is superposed with the second layer, which are coupled to one another by an intermediary layer which extends intermittently in the planar direction. Each of the first and second actuators are selectively actuatable to effect longitudinal expansion thereof, so that relative actuation between individual ones of actuators spaced in the planar direction relative to one another is configured to generate controlled movement of the stage within the planar direction, and so that relative actuation between individual ones of actuators spaced orthogonally to the planar direction relative to one another is configured to generate controlled movement of the stage out of the planar direction. The relative position between the stage and the support is adjustable in each of six degrees of freedom, so that the compliant mechanism forms a quasi-static precision manipulator.

Another aspect of the invention includes a micro electro-mechanical system (MEMS) positioner including a stage and at least one beam extending in a planar direction, with a series of flexure hinges coupled to the stage and to the beams. A series of controlled input thermal actuators extend longitudinally within a first planar layer, being coupled to the beam at spaced locations thereon. A series of members extend longitudinally within a second planar layer, and are coupled to the beam at spaced locations thereon. The first layer is superposed with the second layer. Each of the actuators are selectively actuatable to effect longitudinal expansion thereof, so that actuation of the actuators is configured to generate controlled movement of the stage out of the planar direction and the compliant mechanism forms a quasi-static precision manipulator.

A further aspect of the invention includes a micro electro-mechanical system (MEMS) actuator assembly including a first actuator extending longitudinally in a first planar layer of semiconductor material, to form an electrical pathway therethrough, having a relatively high resistance portion and a relatively low resistance portion. A similar second actuator extends longitudinally in a second planar layer of semiconductor material, so that the first and second layers are superposed with one another with the low resistance portions being coupled to one another, and with the high resistance portions being free of one another. Each of the first and second actuators are configured for selective actuation by selectively conveying electric current therethrough, to generate thermal expansion of the relatively high resistance portions thereof, so that common actuation of both the first and second actuators is configured to generate movement of the actuator system within a planar direction; and actuation of one relative to the other of the first and second actuators is configured to generate controlled movement of the system out of the planar direction.

Another aspect of the invention includes a micro electro-mechanical system (MEMS) actuator assembly including a thermal actuator extending longitudinally in a first planar layer, the actuator forming an electrical pathway therethrough. A member extends longitudinally in a second planar layer, so that the first layer and the second layer are parallel to one another, and the actuator and member are coupled to one another. The actuator is configured for actuation by selective application of electricity thereto, to generate expansion thereof, so that actuation of the actuator is configured to generate controlled movement of the system out of the planar direction.

A yet further aspect of the invention includes a method of fabricating a positioner. The method includes providing a semiconductor wafer having at least two device layers alternately superposed with at least two oxide layers, applying a mask layer to the uppermost device layer, etching exposed portions of the uppermost device layer, and etching exposed portions of the uppermost oxide layer. The method further includes removing the mask layer, applying a metallization layer onto exposed portions of the device layers, masking portions of the metallization layer, to mask a desired contact area, etching the metallization layer to remove unwanted portions thereof, and removing the mask from remaining metallization to reveal contact areas. Additional steps include masking exposed areas of the wafer, etching exposed portions of the exposed device layer, etching exposed portions of the exposed oxide layer, etching exposed portions of exposed device layer, and masking the underside of the wafer and protecting the topside of the wafer. The underside of the wafer is then etched to an oxide layer, followed by applying a vaporized etchant to the wafer to remove exposed portions of oxide layer; and removing the mask.

BRIEF DESCRIPTION OF THE DRAWINGS

FIG. 5 is a schematic cross-sectional view, taken along 5-5 of FIG. 3;

FIG. 6A is a view similar to that of FIG. 3, with the positioner actuated to generate rotational movement about the z-axis;

FIG. 6B is a view similar to that of FIG. 3, with the positioner actuated to generate translational movement along the y-axis;

FIG. 6C is an elevational schematic view of the embodiment of FIGS. 6A & 6B, actuated to generate translational movement along the z-axis;

FIG. 9 is a chart showing simulated results for the embodiments of FIGS. 8A-8F;

FIGS. 10A-10C are cross-sectional elevational views similar to that of FIG. 5, of optional structures being applied to an embodiment of the present invention;

FIG. 14 is a chart of test results comparing aspects of various embodiments of the subject invention.

DETAILED DESCRIPTION

Figure 1:
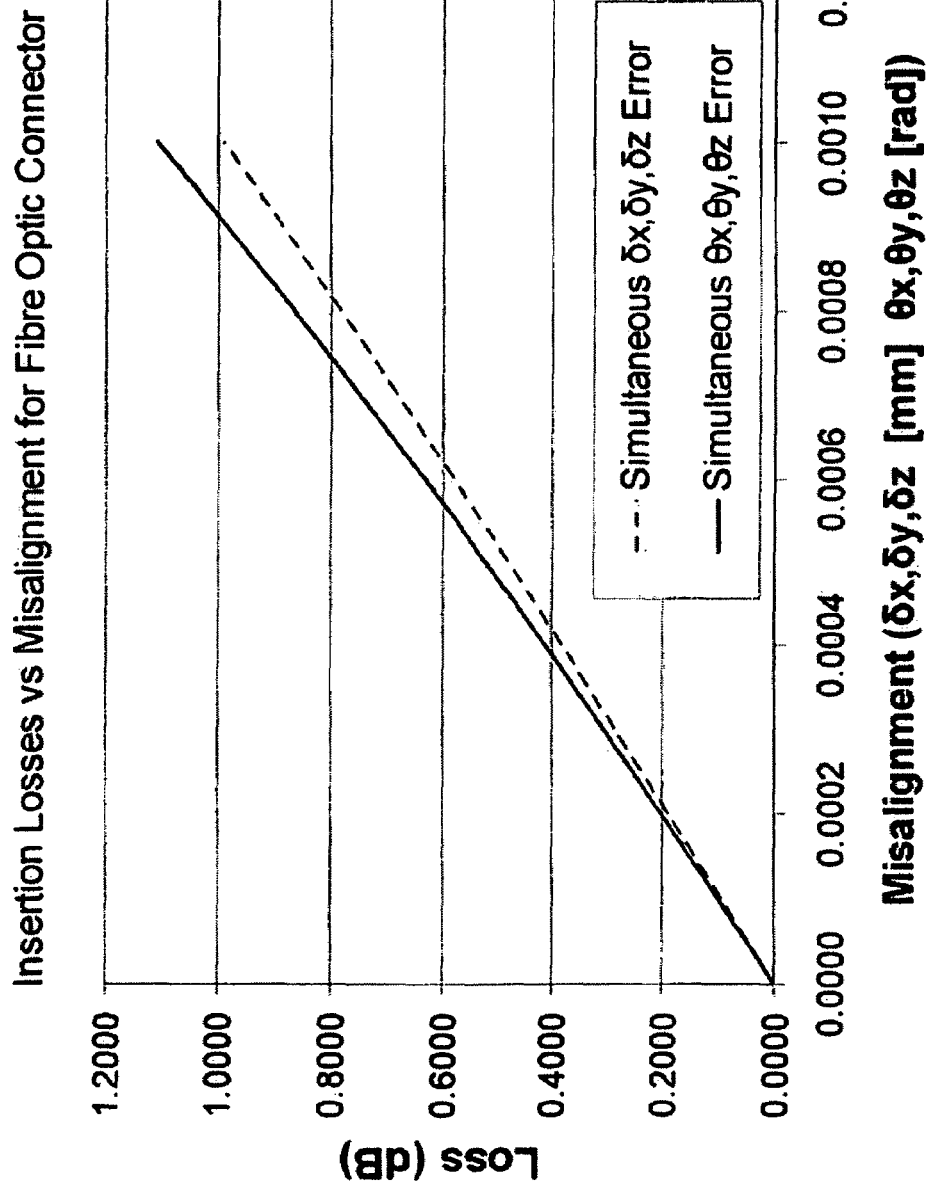
FIG. 1 is a chart showing typical insertion losses associated with fiber optic misalignment.
Figure 2:
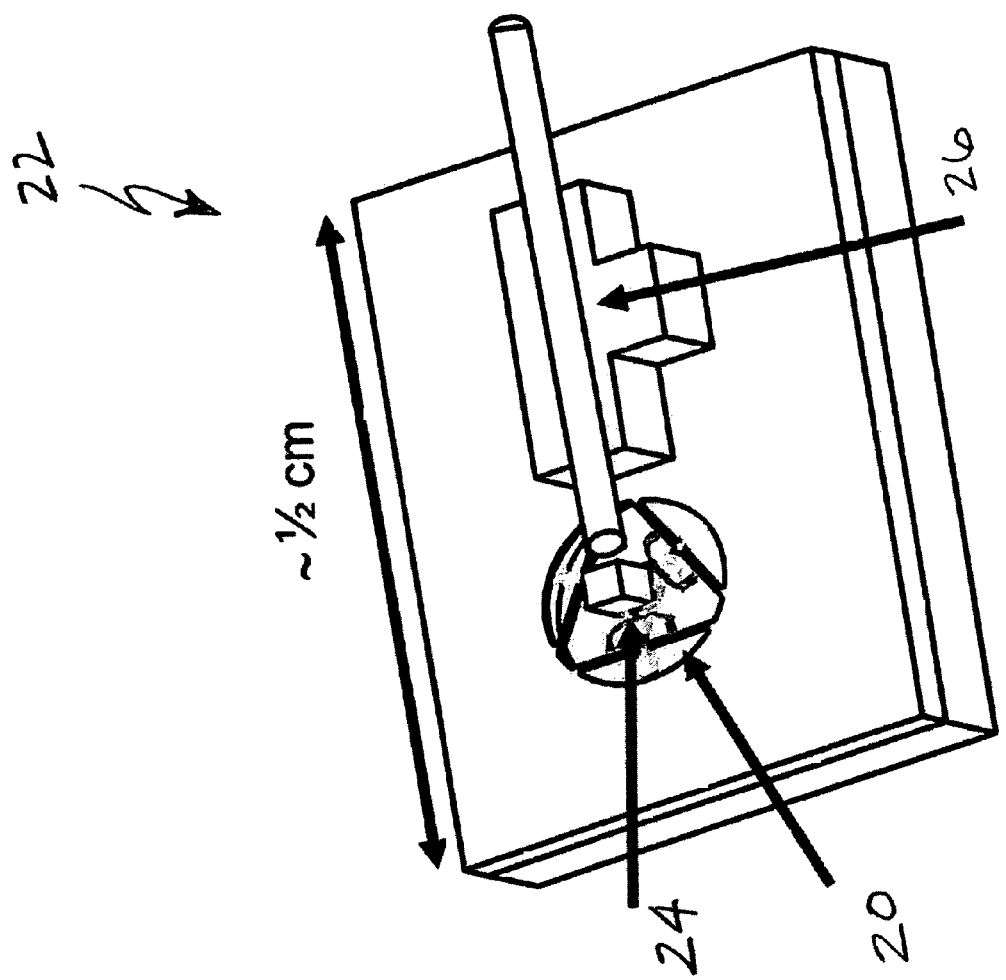
FIG. 2 is a perspective schematic view of a typical fiber optic alignment application.
Figure 3:
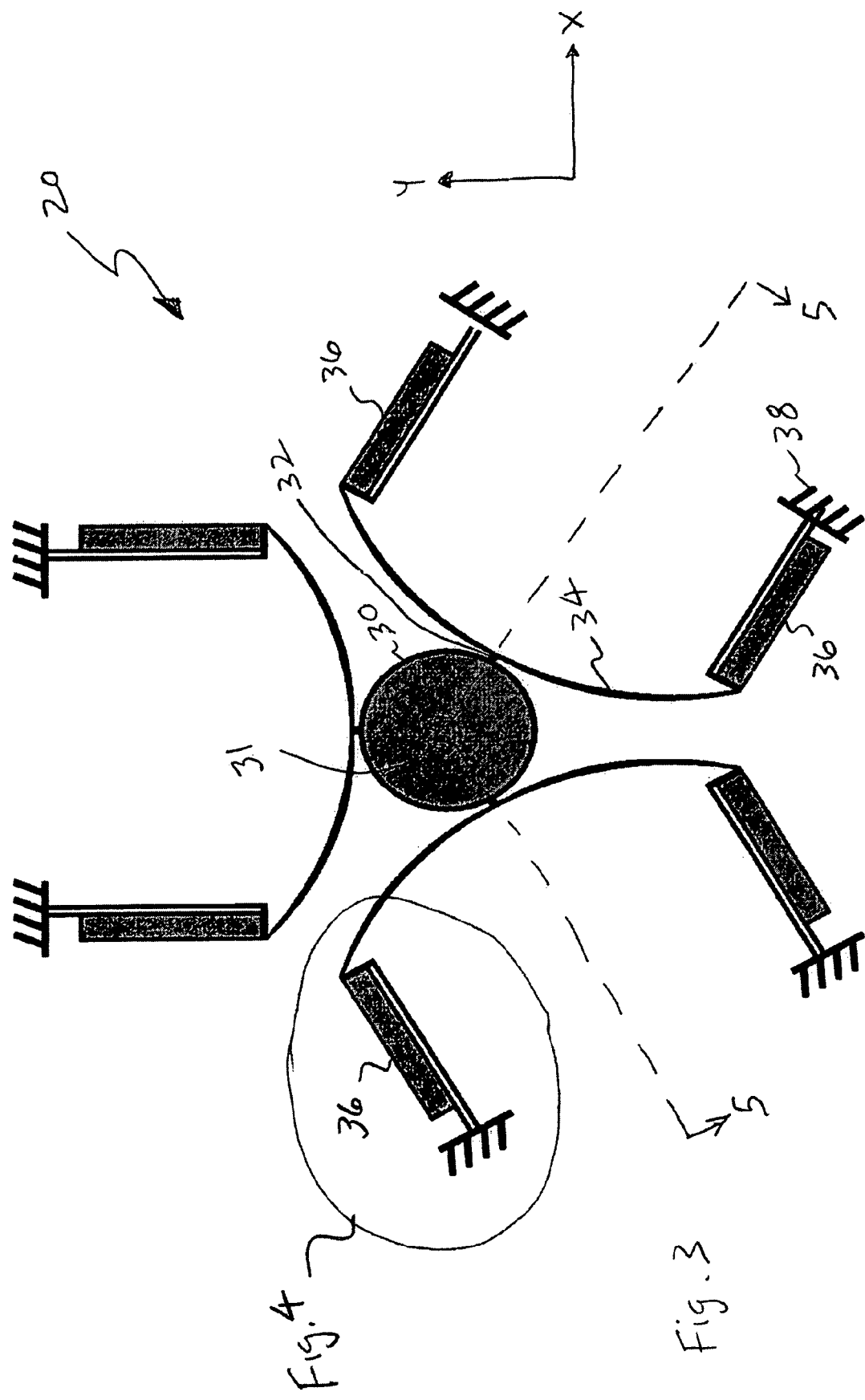
FIG. 3 is a schematic plan view of an exemplary embodiment of a positioner of the present invention.

Referring to the accompanying figures, the present invention is directed to a micro-scale alignment device (e.g., nanopositioner) adapted to provide six-axis alignment (i.e., movement with six degrees of freedom) in microsystems such as MEMS devices. For example, with reference to FIG. 2, an embodiment of the present invention shown as nanopositioner 20, may be installed within a fiber alignment device 22 to align optics 24 with a fiber 26. As shown in FIG. 3, in this embodiment, nanopositioner 20 is a planar, monolithic, micro-scale device which generates controlled displacements/motions via compliance of the device's structure. This device 20 includes an inner stage 30 supported via hinges 32 by beams 34. Beams 34 are coupled, e.g., at opposite ends thereof, to distal ends of actuators 36. Proximal ends of actuators 36 are secured to ground 38.

Advantageously, nanopositioner 20 does not require joints and therefore avoids the friction, wear and hysteresis errors associated with conventional macro-scale devices, and which tend to preclude their use in nanomanipulation (e.g., MEMS) applications. Moreover, this device 20 provides desired six-axis alignment, including both in-plane and out-of-plane movement, using only in-plane actuators. As will be discussed in greater detail hereinbelow, embodiments of the present invention accomplish this movement using an unorthodox multiple layer approach which generates out-of-plane motion without the use of out-of-plane actuators. As typically used, and as used herein, 'in-plane' motion refers to motion in the x, y, and $\theta_z$ directions (FIG. 3), while 'out-of-plane' motion refers to motion in the $\theta_x$, $\theta_y$, and z directions.

Examples of device 20 have been shown to achieve six-axis alignment in a work volume (i.e., work envelope) as small as 5×5×2 $\mu m^3$, with nanometer/micro-radian resolution (e.g., resolution of 0.015 μm with repeatability of 5 nanometers and a force of approximately 150 μN from a device with a 1 $mm^2$ device footprint. These embodiments are easily scalable, and additional examples, e.g., having footprints of 1.2, 1.5 and 3 $mm^2$ have been built. Moreover, exemplary devices having a work volume of 6×6×10 $\mu m^3$ have been shown to generate up to 500 μN of force, to exhibit a force ratio of approximately 80 μN of force for each 1 μm of in plane work envelope. The combination of these abilities makes embodiments of the present invention capable of practical, six-axis alignment of small-scale components. These embodiments may thus be used in many micro-scale applications, such as MEMS, fiber optic components including wave guides and sources/receivers, and micro-photonic components/chips. In addition, embodiments of the present invention may be configured to provide for long term fixation without power.

These and other advantages of this invention will become evident in light of the following detailed discussion of various embodiments thereof.

Figure 4:
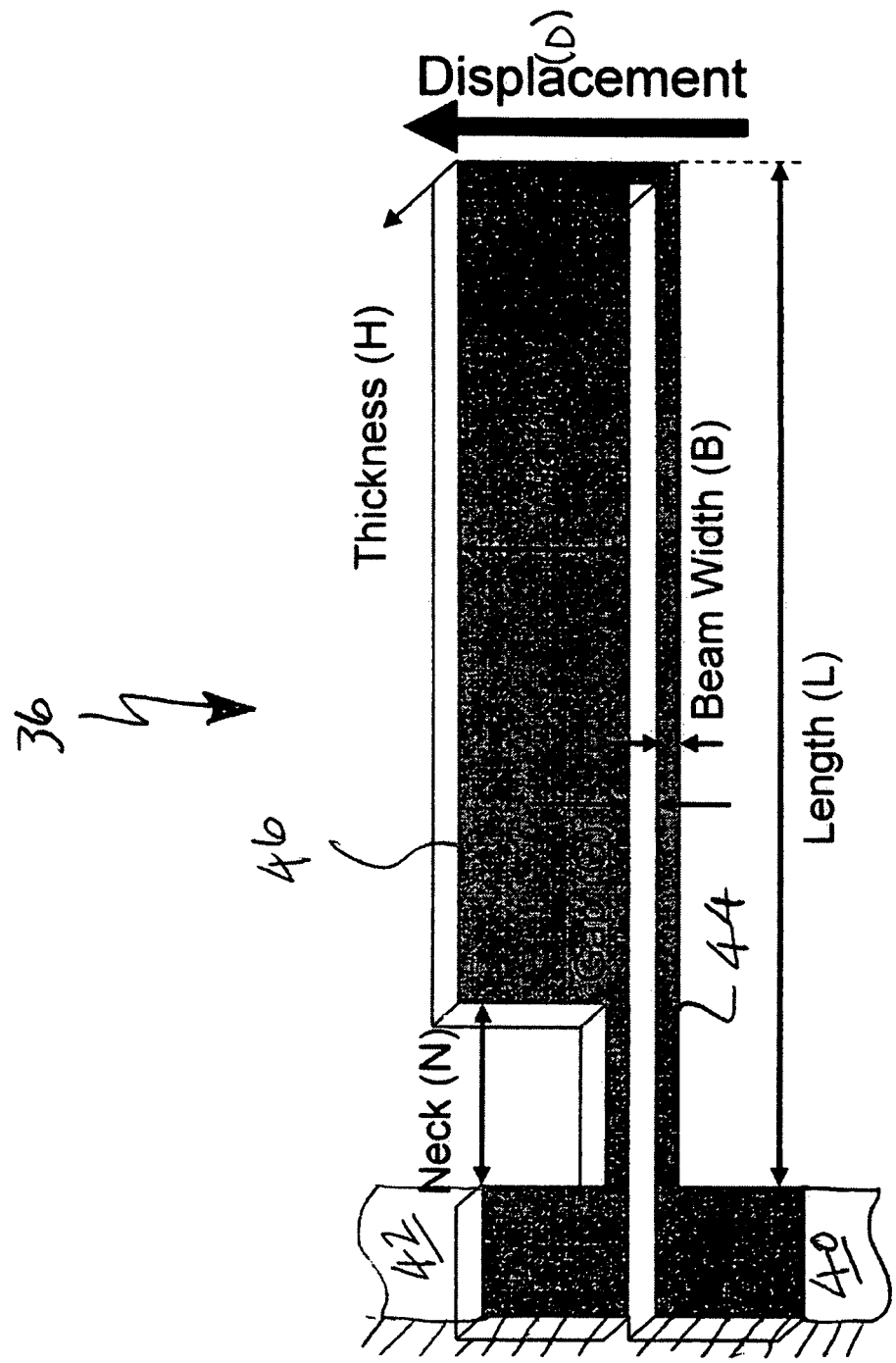
FIG. 4 is a schematic perspective view of an actuator, on an enlarged scale, of the embodiment of FIG. 3.

Turning now to FIG. 4, embodiments of the present invention are provided with a generally U-shaped actuator 36. Actuator 36 extends longitudinally along a length L within a first planar layer of thickness H as shown. This actuator is fabricated from, or otherwise includes electrically conductive or semiconductive material(s) so that it effectively forms a U-shaped electrical pathway extending between contacts disposed proximate to first and second grounded end portions 40, 42, respectively. In particular embodiments, actuator 36 is fabricated from a semiconductor material as discussed hereinbelow. In these embodiments, the electrical pathway is formed by a relatively narrow, and high resistance, portion 44 separated by a gap G from a relatively wide, and low resistance, portion 46. An open neck portion 48 facilitates displacement as discussed hereinbelow.

During operation, current passing through actuator 36 along the U-shaped electrical pathway tends to heat up high resistance portion 44, while low resistance portion 46 remains relatively cool. This action generates longitudinal expansion of the portion 44 relative to portion 46, which displaces actuator 36 in the direction of displacement D as shown.

Turning now to FIG. 5, device 20 is provided with a multiple layer construction, to include a first set of actuators 36 disposed on the first layer, and a second layer of actuators 36' disposed on a second layer. In the embodiment shown, a spacer layer 37 is used to physically join, while separating and thermally insulating, the first and second layers to effectively form a three-layer construction. Stage 30, 30' may be optionally provided with a central bore 31, 31' to facilitate some positioning applications.

The multi-layer architecture, while tending to be counterintuitive for the reasons discussed below, advantageously provides device 20 with both in-plane and out-of-plane motion. For example, simultaneous actuation of both superposed first and second actuators 36 and 36' generates movement of stage 30, 30' 'in-plane' such as shown in FIGS. 6A & 6B. In FIG. 6A, alternate pairs of actuators 36 and 36' have been actuated to generate in-plane rotation of stage 30 around the z-axis. In FIG. 6B, all but two of the actuator pairs 36, 36' have been actuated to displace stage 30 along the y-axis.

Out-of-plane motion may be generated by activating actuators 36, 36' independently of one another, (or energizing them with different power levels to achieve combinations of in-plane and out-of-plane displacement). As shown in FIG. 6C, actuators 36 have been activated without activating actuators 36', to move stage 30 in the −z direction.

Those skilled in the art will recognize that nominally any combination of actuators 36, 36' may be activated to generate movement of stage 30 in any one or more of six degrees of freedom, i.e., x, y, z, $\theta_x$, $\theta_y$, $\theta_z$, alone or in combination.

Advantageously, this multi-layered construction enables both in-plane and out-of-plane motion solely by use of in-plane actuators. This aspect facilitates fabrication on a micrometer scale, e.g., on a semiconductor wafer, for MEMS and other micro-scale applications, using many conventional semiconductor/integrated circuit (IC) fabrication techniques, despite conventional wisdom in this regard. Conventional wisdom generally indicates that the bond formed between layers fabricated using techniques such as chemical vapor deposition, microlithography, and etching (e.g., deep reactive ion etching (DRIE)) would likely fail due to shear when subjected to the out-of-plane loading described herein. Surprisingly, however, finite element simulations and tests of the multi-layered silicon-based embodiments of the present invention have demonstrated out-of-plane movement of stage 30, 30' without buckling or delamination.

Yet another unexpected advantage of the multi-layered construction of embodiments of the present invention is the ability to achieve a high degree of flatness. Flatness is a quality that is highly desirable for micro-scale precision manipulators such as device 20, but is relatively difficult to achieve in MEMS devices. While not wishing to be tied to any particular theory, applicants suspect that embodiments hereof attain their high degree of flatness because residual stresses inherent in each single layer as a result of conventional MEMS fabrication techniques, tend to offset one another. Thus, any stresses within one of the two outer layers are effectively balanced by those of the other outer layer. The flatness of the central stage has been shown to be as small as a +/−1 μm deviation over 3 mm size.

Another factor tending to militate against the multi-layered approach of the instant invention is the high thermal conductivity of silicon and other semiconductors. It would thus be expected that the heat generated during activation of actuator 36 would tend to transfer readily to its mirror image actuator 36' and prevent the creation of a thermal gradient between the layers sufficient to generate the required out-of-plane movement. The instant applicants, have, however, overcome this difficulty through the use of the aforementioned intermediary layer (e.g., SiO2).

Figure 7:
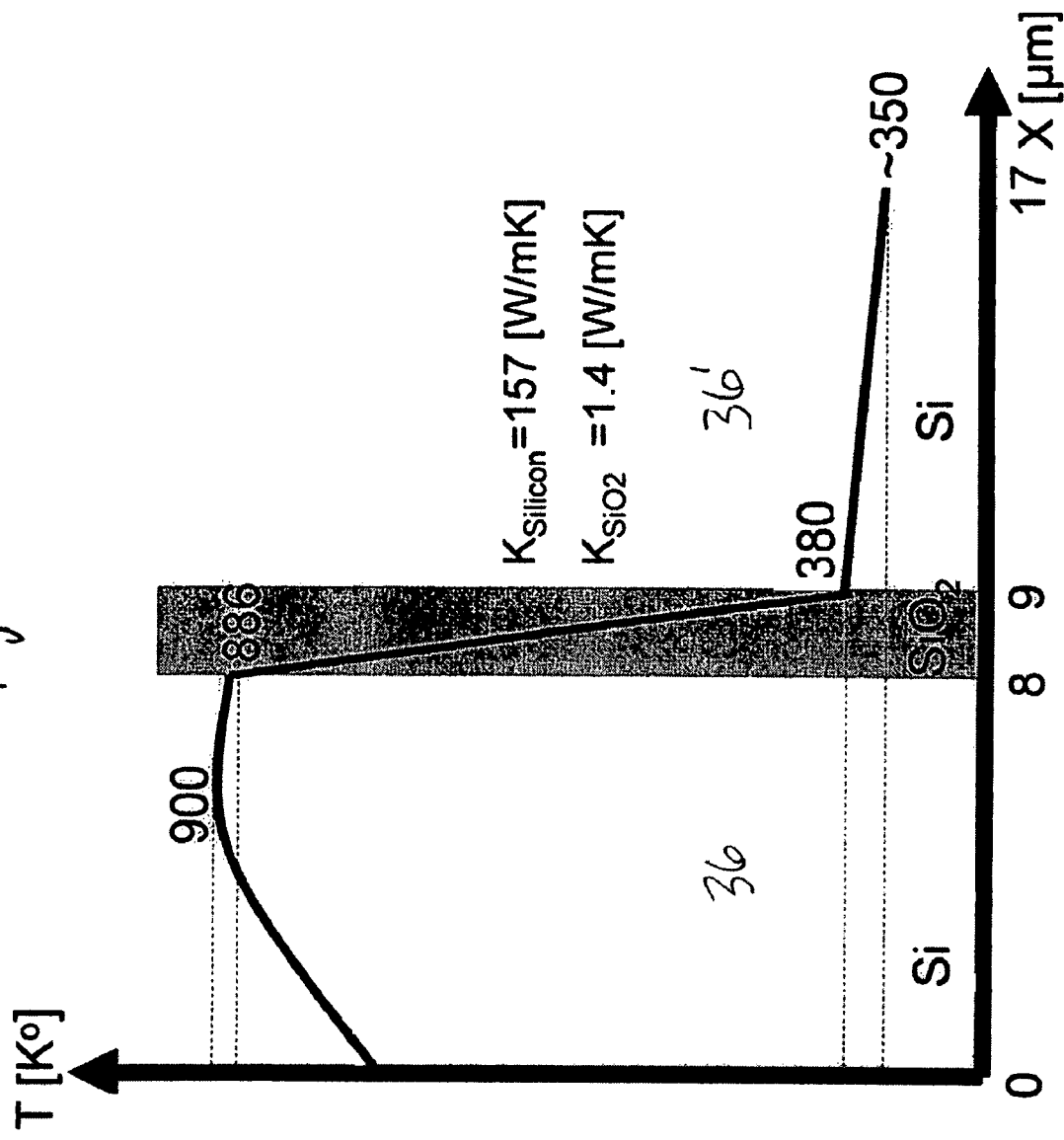
FIG. 7 is a graphical representation of the temperature profile of a portion of the embodiment of FIG. 5.
Figure 8:
FIGS. 8A-8F are views similar to those of FIGS. 6A & 6B, of various alternate embodiments of the present invention actuated to generate translational movement in the x-direction.
Figure 8:
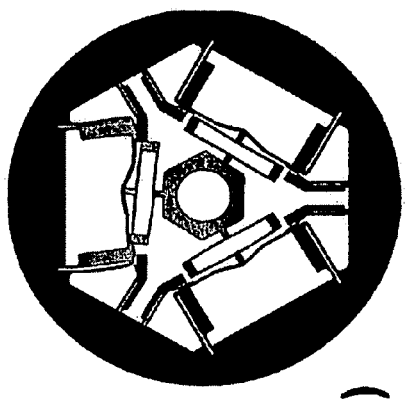
Figure 8:
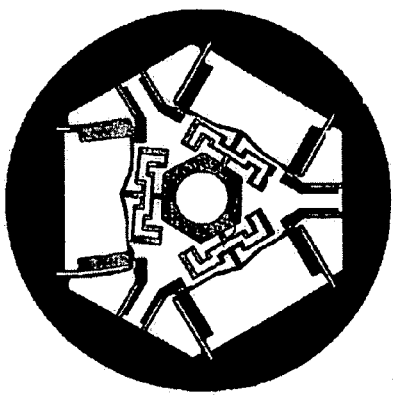
Figure 8:
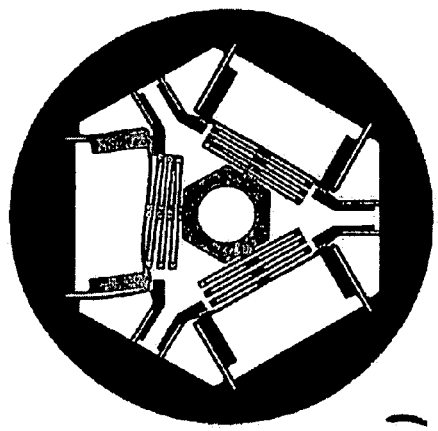

In this regard, attention is directed to FIG. 7, which is a simulated, representative thermal profile taken through the high resistance portions (FIG. 4) of an activated actuator 36, an adjacent inactive actuator 36', and an intermediate layer of $SiO_2$ disposed therebetween. This profile indicates that even in the event that a portion of actuator 36 were as high as 900 degrees K, a corresponding portion of actuator 36', separated from actuator 36 by only a one micron thickness of $SiO_2$, would remain at or below approximately 380 degrees K to provide a significant thermal gradient. Moreover, an air gap, such as provided between portions (e.g., high resistance portions) of adjacent actuators 36, 36' is expected to provide even greater thermal isolation for an even greater thermal gradient.

Turning now to FIGS. 8A-8F, various embodiments of the invention desirably utilize actuators that are relatively stiff in their lateral directions, while providing compliant support for stage 30 in the longitudinal direction. Device 20 provides the requisite lateral stiffness through the use of actuators 36, 36', as shown and described hereinabove, while the desired longitudinal compliance is provided by beams 34 (FIG. 3). Although the configuration of device 20 has been found to meet these requirements, many other configurations may be devised to provide the desired functionality. Examples of various alternate configurations are shown in FIGS. 8A-8E, with device 20 shown in FIG. 8F. In these figures, each embodiment is shown with its actuators selectively activated to generate displacement in the x-direction.

Simulated results for each of the embodiments of FIGS. 8A-8F are shown in FIG. 9. These results indicate that device 20 (FIG. 8F) provides the highest maximum displacement of the center of its stage, and the highest transmission ratio. As used herein, 'transmission ratio' refers to the ratio of the movement of the center of stage 30, 30' to the movement at the distal end of actuators 36, 36'. While these embodiments provide a transmission ratio ranging from about 0.05 to about 0.8, in light of the disclosures herein, the skilled artisan will recognize that embodiments of the present invention may be configured with a transmission ratio within a range extending from much smaller than one, e.g., on the order of 0.05, to orders of magnitude larger, e.g., on the order of 10-50. Turning now to FIGS. 10A-10C, as an additional option, a fixation layer 50 may be utilized. For clarity of exposition, and for convenience, fixation layer 50 is shown and described as being applied to a device 20, of which only the upper layer thereof, including actuators 36 and stage 30, is shown. It is to be understood that a similar fixation layer may be applied to any of the embodiments shown and described herein.

Fixation layer 50 serves to maintain the relative position of stage 30, 31', without requiring a continuous supply of power to the device 20. Fixation layer 50 may be fabricated from the same material as that of device 20, e.g., using similar fabrication techniques.

For example, layer 50 may be patterned, e.g., using conventional etching/masking techniques, to produce a heater portion 53 supported by a spacer layer 51, to extend in spaced, superposed orientation with device 20. A portion of layer 50 may also be deposited onto stage 30, e.g., atop a suitably sized portion of spacer layer 51 as shown, to form a collar 52. Clearance sufficient to permit normal operation of device 20 is provided between collar 52 and terminal ends 54 of ground portions 53 as shown. Solder 56 is deposited on terminal ends 54.

In operation, device 20 is operated as described hereinabove, to move stage 30 (30') to a desired position, such as shown in FIG. 10B. Thereafter, heater portions 53 are heated, e.g., by passing electric current therethrough in a conventional manner, to melt solder 56, so that the solder flows between terminal ends 54 and collar 52. Facing surfaces of ends 54 and collar 52 may be optionally metallized to facilitate flow of the melted solder into the position shown in FIG. 10C.

Heater portions 53 may then be deactivated to permit solder 56 to solidify while actuators 36, 36' maintain stage 30, 30' in the desired position. In this regard, because the actuators are disposed relatively far away from solder 56 and from stage 30 (see, e.g., FIG. 3), heat generated by the actuators should not prevent solidification of solder 56 in most applications. Once solder 56 has solidified, the actuators may be powered down, wherein the solder 56 will maintain stage 30, 30' in the desired position. In the event re-alignment is desired, heater portions 53 may be re-heated to re-melt solder 56, whereupon stage 30, 30' may be moved to a new position.

Although the sequence of operations shown and described with respect to FIGS. 10A-10C relate to fixation of an in-plane displacement, the skilled artisan should recognize that this fixation approach may be used to maintain nominally any position of stage 30, 30', e.g., positions including any combination of translations and rotations with up to six degrees of freedom.

Having described various embodiments of the present invention, the following is a description of an exemplary method of fabrication thereof. This method is shown and described with respect to device 20, with the understanding that the skilled artisan, in light of the teachings hereof, may apply it to any of the other embodiments shown and described herein.

Figure 11A:
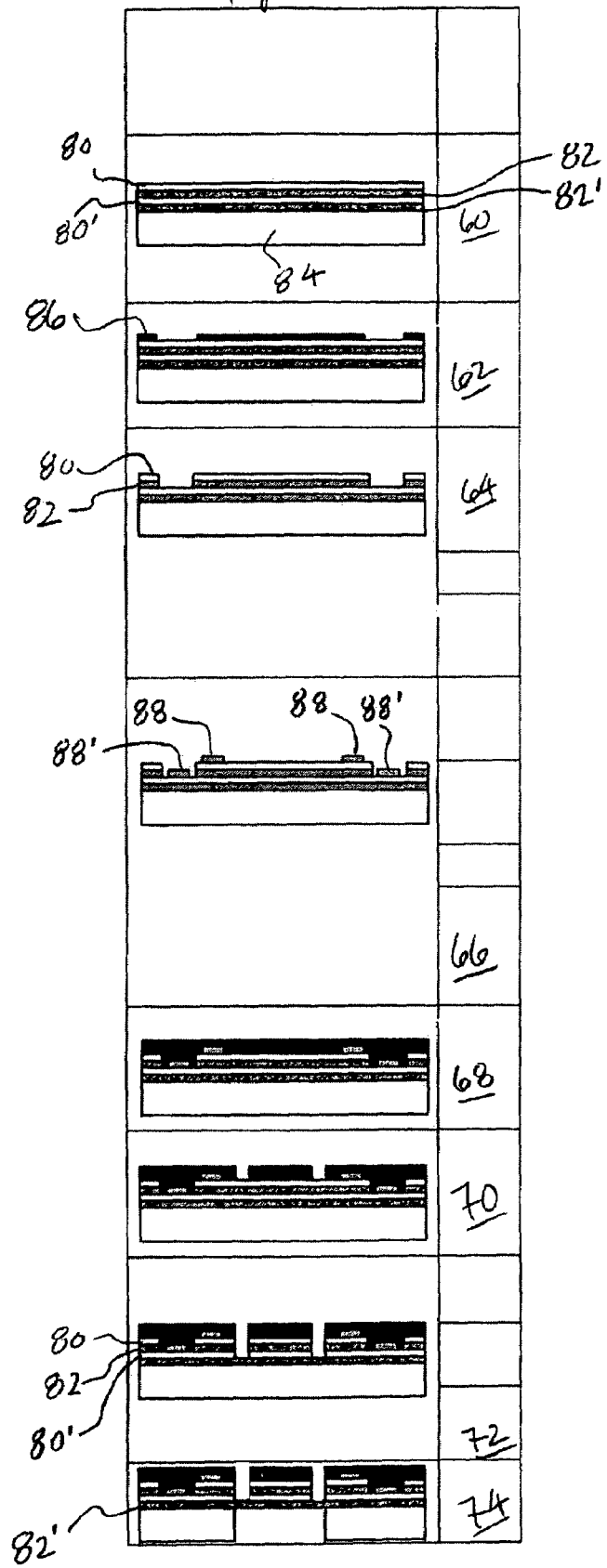
FIG. 11 is a table of cross-sectional elevational views similar to those of FIGS. 10A-10C, of various steps in the fabrication of the embodiment of FIGS. 3 and 5.

Turning now to FIG. 11, at 60, a double SOI (silicon on insulator) wafer is provided, having two device layers 80, 80' (e.g., 8 μm thick), and two oxide layers 82, 82' (e.g., 1 μm thick) on an insulator 84. Although a double silicon wafer is used in this example, embodiments of this invention may be fabricated from nominally any material known to those skilled in the art, including semiconductors such as doped silicon and/or aluminum nitride (AlN), or nominally any other material which may be developed in the future. In this regard, it is anticipated that non-conductive materials, e.g., having conductive components embedded therein, may be used to fabricate various embodiments hereof.

At 62, a photoresist 86 is applied and patterned to form a mask layer. At 64, a shallow etchant is applied to remove the exposed portions of device layer 80. A second etchant is then applied to remove the newly exposed portions of oxide layer 82. Photoresist layer 86 is then removed, e.g., through the use of asher (oxygen plasma).

At 66, electrical contacts 88, 88' for the actuators (36, 36' FIG. 5) are provided by applying (e.g., by sputtering, evaporating, or other means of depositing or growing) a metallization layer onto the wafer, i.e., onto exposed portions of layers 80 and 82. A photoresist is applied and patterned to portions of the metallization layer, to mask the desired contact area. An aluminum etchant is then used to remove unwanted aluminum. The photoresist is then removed, e.g., with oxygen plasma.

At 68, a relatively thick photoresist is applied to exposed surfaces of the wafer, and prebaked. The photoresist is patterned 70 into the desired topography of device 20 (e.g., FIG. 3).

At 72, a shallow etchant is applied to remove the exposed portions of device layer 80. A second (e.g., vaporized) etchant is then applied to remove the newly exposed portions of oxide layer 82. A shallow etchant is again applied to remove the exposed portions of second device layer 80'.

At 74, the underside of the wafer is patterned with a photoresist and etched to the oxide layer 82'. At 76, a vaporized etchant (e.g., HF vapor) is used to remove exposed portions of oxide layer 82'. At 78, the photoresist is removed, e.g., by use of oxygen plasma, to produce completed device 20.

The following illustrative example is intended to demonstrate certain aspects of the present invention. It is to be understood that this example should not be construed as limiting.

EXAMPLE

An exemplary device 20 of 3 mm in diameter was fabricated substantially and shown and described with respect to FIG. 11. A double SOI wafer with two device layers of thickness 8 μm, and two oxide layers 1 μm (N type/Sb Doped/ <110>/Resistivity=0.01~0.1 ohm/cm) was used in step 60. An Endura™ vapor deposition machine was used to sputter a 5000 Angstroms aluminum (Al+2% Si) metallization layer in step 66. A vapor of concentrated HF (49%) was used to etch oxide layer 82' in step 76.

Figure 12B:
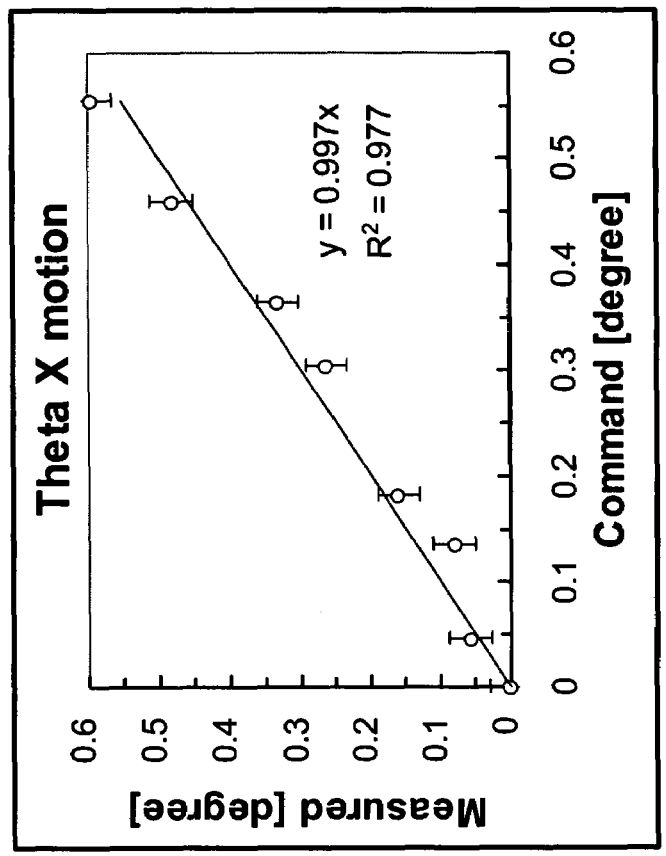
FIGS. 12A and 12B are graphical representations of theoretical vs. actual test results of an embodiment of the present invention.
Figure 12A:
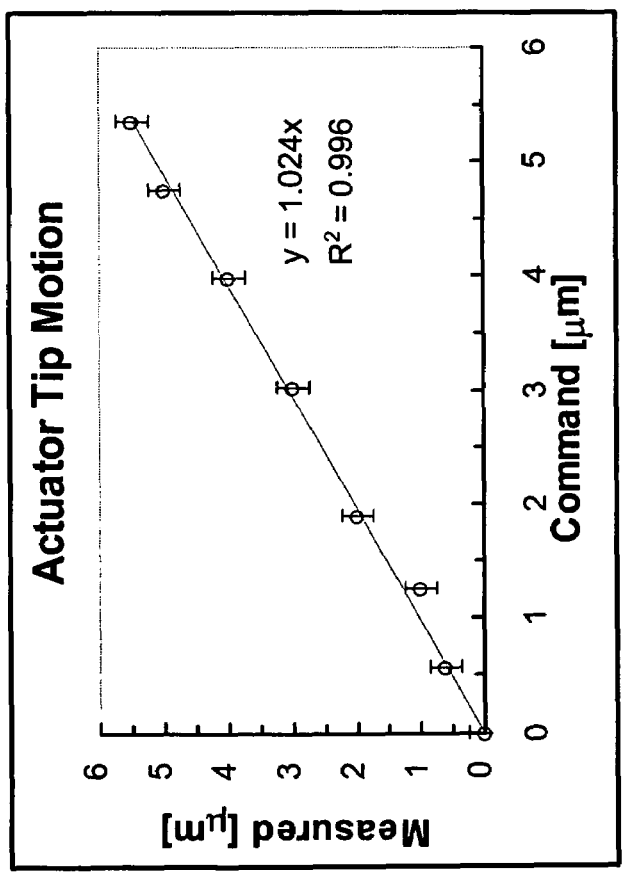

In-plane and out-of-plane tests were conducted on the resulting device 20 using a ZYGO™ white light interferometer and a Micro-vision™ system to view the static and dynamic functions. Displacement of the device was measured and plotted as a function of input current as shown in FIGS. 12A and 12B. These test results indicated actual, non-calibrated displacement generally within 10 percent of theoretical, using finite element analysis (FEA). The working temperature is expected to be within the range of 300-900 K, with a resolution of approximately 0.015 μm and repeatability to within approximately 0.005 μm. The expected work volume for this embodiment, as indicated in terms of the range of motion in each of the aforementioned six degrees of freedom, measured at the center of stage 30, is shown in the following Table 1.

TABLE 1

| | X [μm] | Y [μm] | Z [μm] | $\theta_x$ [degree] | $\theta_y$ [degree] | $\theta_z$ [degree] |
|---|---|---|---|---|---|---|
| Range | 4.16 | 4.36 | 10.50 | 1.26 | 1.09 | 1.34 |

Figure 13:
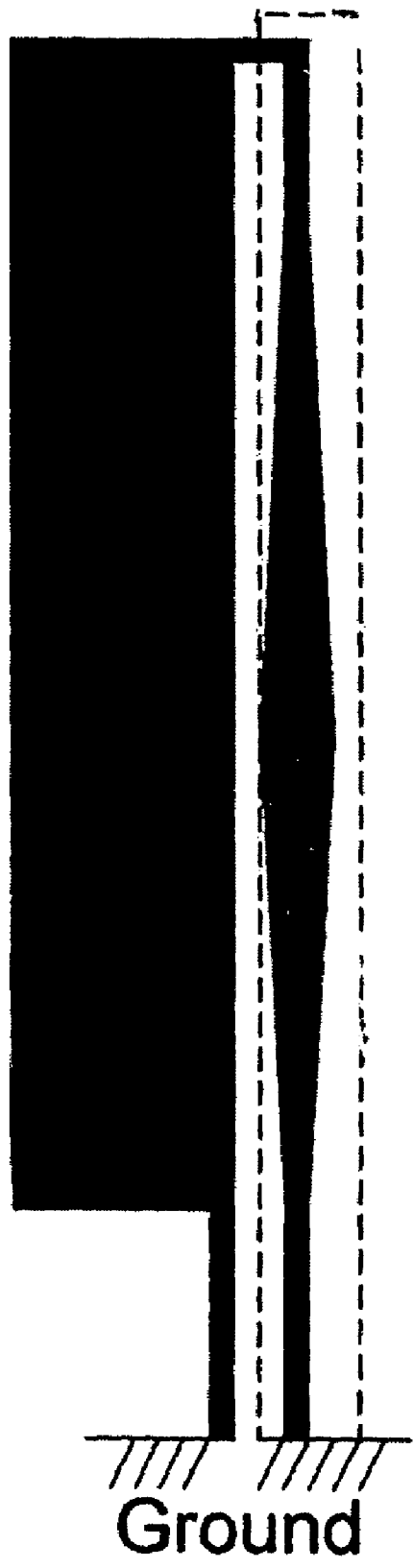
FIG. 13 is a plan view of a portion of an alternate embodiment of the present invention.

Turning now to FIGS. 13 and 14, still another optional variation of the foregoing embodiments is shown and described. In the foregoing embodiments, actuators 36, 36' were shown and described having high resistance portions 44 (FIG. 4) of substantially uniform transverse cross-section. However, as shown in FIG. 13, alternative embodiments of the instant invention may be provided with actuators 136 having high resistance portions 144 of non-uniform, e.g., contoured, transverse cross-sections.

It has been found by the instant inventors that such a contoured transverse cross-section may generate improved output force and/or stroke. The inventors have found that by varying the width of beam 'in-plane', temperature distribution (thermal strain) in the beam portion 144 is enhanced, while the bending stiffness (potential to store energy) is reduced, relative to similar beam portions of uniform cross-section. As such, these portions 144 generally have improved mechanical efficiency (higher force and stroke) and improved utilization of actuating power relative to beam portions of uniform transverse cross-section.

In a particular exemplary embodiment, a finite element analysis (FEA) simulation of actuator performance for a constant width silicon beam (width: 22.5 µm) was compared with that of a contoured beam (width: 15-30 µm, averaging 22.5 µm). Each actuator beam had the same length of 1.6 mm and the same thickness of 30 µm. Both beams were tested in a conventional chevron configuration with an included taper angle of 1 degree. The same maximum temperature (680 K) was set for each actuator portion. The results of the simulation indicated that the contoured beam had a wider, more uniform temperature distribution. A more uniform temperature distribution generally means that more material along the length of the beam is at a higher temperature, so that the contoured beam exhibits a greater overall temperature-induced strain (i.e., displacement) than does the constant width beam.

A comparison of the performance of the two actuator types is provided in FIG. 14. This comparison indicates that the contoured beam generates approximately a 100% increase in stroke (displacement), a 50% reduction in response time, and a 10% reduction in power requirements relative to a similar beam portion of uniform cross-section. Moreover, preliminary experiments have shown the actuator has up to an 800 µm stroke, and is otherwise suitable for general MEMS actuator design.

The artisan of ordinary skill will readily recognize that there are many variable shapes and configurations for the various portions of the various embodiments of this invention that may be used to alter the repeatability, resolution, and position control capabilities, etc., thereof.

Figure 15:
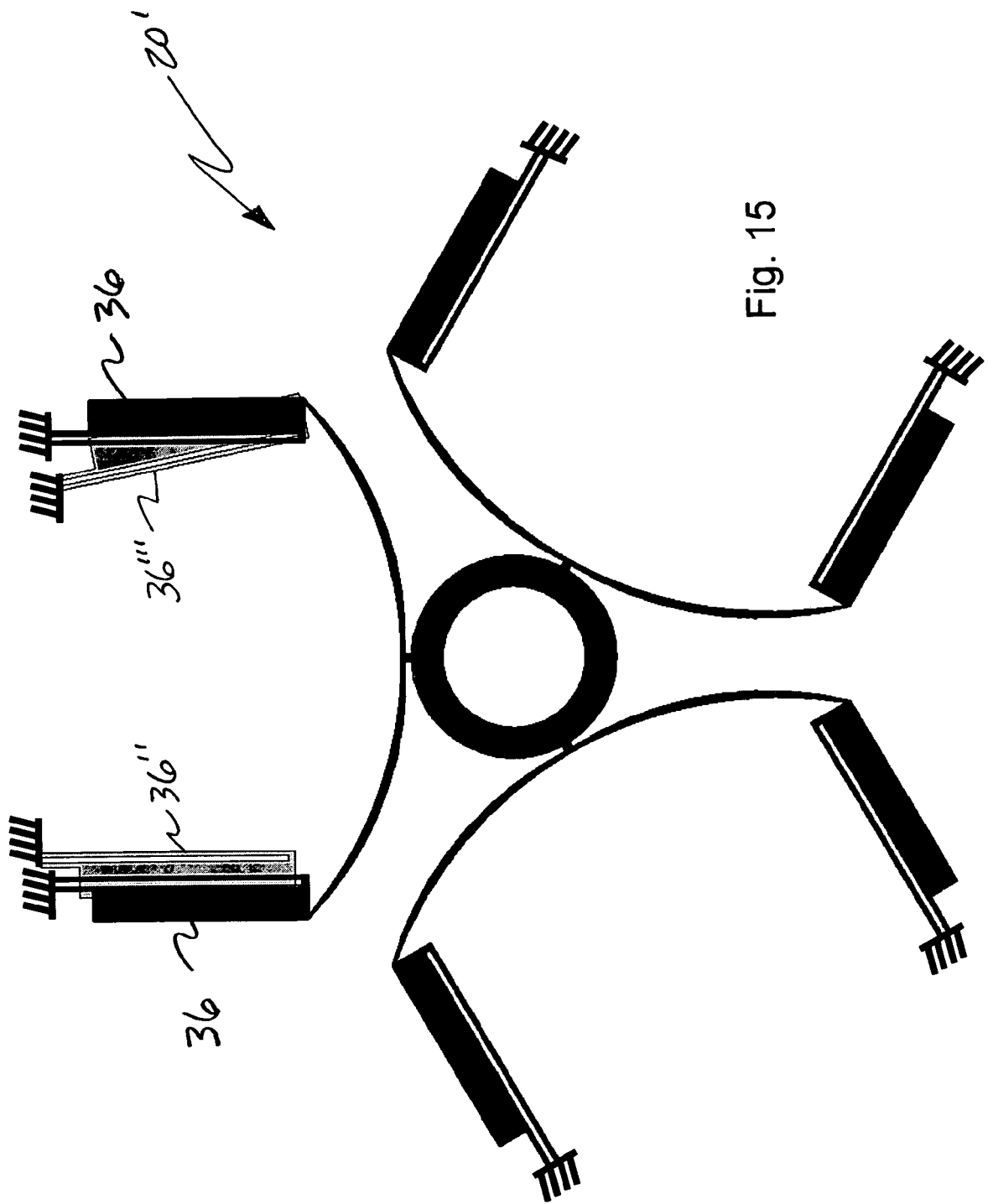
FIG. 15 is a view similar to that of FIG. 3, of an alternate embodiment of the present invention including various optional aspects.

Moreover, although embodiments have been shown and described herein effectively having 'mirror image' actuators 36, 36' superposed with one another, it should be recognized by those skilled in the art, that such mirror image actuators may be disposed in non-superposed or offset relationship from one another without departing from the spirit and scope of the present invention. For example, an alternate embodiment of the present invention shown as device 20' in FIG. 15, may be configured substantially similarly to that of device 20, though having the actuators of one of its layers shifted and/or rotated in plane relative to those of the other layer. As shown, actuator 36" of a second layer is shifted in plane relative to its corresponding actuator 36. In addition, or alternatively, an actuator 36''' of the second layer may be rotated relative to its corresponding actuator 36 as also shown.

In addition, the skilled artisan should also recognize that various embodiments of the present invention may include substantially any type of layered MEMS actuator system, including two or more mutually distinct types of actuators, and/or non-activatable actuators (e.g., compliant substrates), to enable out of plane motion without departing from the spirit and scope of the present invention.

The modifications to the various aspects of the present invention described hereinabove are merely exemplary. Other variations, modifications, and other implementations of what is described herein will also occur to those of ordinary skill in the art without departing from the spirit and the scope of the invention as claimed. Accordingly, the invention is to be defined not just by the preceding illustrative description, but instead by the spirit and scope of the following claims.

What is claimed is:

1. A micro electro-mechanical system (MEMS) positioner comprising:
a first stage extending in a planar direction within a first layer of semiconductor material;
a plurality of first beams extending in the planar direction within said first layer;
a plurality of first flexure hinges disposed within said first layer, coupled to said stage and to said beams;
a plurality of first controlled input thermal actuators extending longitudinally within said first planar layer;
said first actuators being coupled to said first beams at spaced locations thereon;
a second stage extending in a planar direction within a second layer of semiconductor material;
a plurality of second beams extending in the planar direction within said second layer;
a plurality of second flexure hinges disposed within said second layer, coupled to said second stage and to said second beams;
a plurality of second controlled input thermal actuators extending longitudinally within said second planar layer;
said second actuators being coupled to said second beams at spaced locations thereon;
said first layer being superposed with said second layer;
said first layer and said second layer being coupled to one another by an intermediary layer;
said intermediary layer extending intermittently in the planar direction, wherein said first and second layers are coupled to one another at spaced locations thereon;
each of said first and second actuators being selectively actuatable to effect longitudinal expansion thereof;
wherein relative actuation between individual ones of actuators spaced in said planar direction relative to one another is configured to generate controlled movement of said stage within the planar direction;
wherein relative actuation between individual ones of actuators spaced orthogonally to said planar direction relative to one another is configured to generate controlled movement of said stage out of the planar direction;
the relative position between said stage and said support being adjustable in each of six degrees of freedom;
wherein said compliant mechanism forms a quasi-static precision manipulator.

2. A micro electro-mechanical system (MEMS) positioner comprising:
a stage extending in a planar direction;
at least one beam extending in the planar direction;
a plurality of flexure hinges coupled to said stage and to said beams;
a plurality of controlled input thermal actuators extending longitudinally within a first planar layer;
said actuators being coupled to said at least one beam at spaced locations thereon;
a plurality of members extending longitudinally within a second planar layer;
said members being coupled to said beam at spaced locations thereon;
said first layer being superposed with said second layer;
each of said actuators being selectively actuatable to effect longitudinal expansion thereof;
wherein actuation of said actuators is configured to generate controlled movement of said stage out of the planar direction;

wherein said compliant mechanism forms a quasi-static precision manipulator.

3. The actuator assembly of claim 2, wherein:
said actuators includes first controlled input actuators;
said members includes second controlled input actuators being selectively actuatable to effect longitudinal expansion thereof;
wherein relative actuation between individual ones of actuators spaced in said planar direction relative to one another is configured to generate controlled movement of said stage within the planar direction;
wherein relative actuation between individual ones of actuators spaced orthogonally to said planar direction relative to one another is configured to generate controlled movement of said stage out of the planar direction;
the relative position between said stage and said support being adjustable in each of six degrees of freedom.

4. The positioner of claim 2, wherein said stage comprises a first stage disposed within a first layer of semiconductor material.

5. The positioner of claim 2, wherein said at least one beam comprises a first beam extending in the planar direction within said first layer.

6. The positioner of claim 5, wherein said first beam comprises a plurality of first beams disposed within said first layer.

7. The positioner of claim 6, wherein first flexure hinges are disposed within said first layer.

8. The positioner of claim 6, said actuators are coupled to said plurality of beams at spaced locations thereon.

9. The positioner of claim 2, wherein said stage comprises a second stage extending in a planar direction within a second layer of semiconductor material.

10. The positioner of claim 9, wherein said at least one beam comprises a second beam extending in the planar direction within said second layer.

11. The positioner of claim 10, wherein said second beam comprises a plurality of second beams disposed within said second layer.

12. The positioner of claim 11, a plurality of second flexure hinges disposed within said second layer, coupled to said second stage and to said second beams.

13. The positioner of claim 3, wherein said plurality of second controlled input actuators comprises thermal actuators.

14. The positioner of claim 12, wherein said second actuators are coupled to said second beams at spaced locations thereon.

15. The positioner of claim 2, wherein said first layer and said second layer are coupled to one another by an intermediary layer.

16. The positioner of claim 15, wherein said intermediary layer extends intermittently in the planar direction, so that said first and second layers are coupled to one another at spaced locations thereon.

17. The positioner of claim 3 wherein the relative position between said stage and ground is adjustable with a translational resolution in increments as small as one nanometer.

18. The positioner of claim 3 wherein the relative position between said stage and ground is adjustable with a rotational resolution in increments of less than about 5 micro radians.

19. The positioner of claim 3, having a work envelope as small as 5×5×2 µm³.

20. The positioner of claim 3, generating a force ranging from about 150 to 500 micronewtons with a work volume ranging from 5×5×2 to about 6×6×10 micrometers.

21. The positioner of claim 3, exhibiting a force/work envelope ratio of at least about 80 micronewtons of force for each micrometer of in plane work envelope.

22. The positioner of claim 3, being fabricated from a semiconductor.

23. The positioner of claim 22, being fabricated from silicon.

24. The positioner of claim 3, having a transmission ratio ranging from:
at least about 0.05;
to about 50.

25. The positioner of claim 24, having a transmission ratio ranging from:
about 0.05;
to about 0.8.

26. The positioner of claim 2, wherein said stage is coupled to flexure hinges spaced in a substantially equilateral triangular pattern.

27. The positioner of claim 26 wherein said plurality of support beams are arranged in a substantially equilateral triangular pattern.

28. The positioner of claim 3, wherein said first controlled input actuators are superposed with said second controlled input actuators.

29. The positioner of claim 3, wherein at least one of said first controlled input actuators is offset in the planar direction from a corresponding one of said second controlled input actuators.

30. A micro electro-mechanical system (MEMS) actuator assembly comprising:
a first actuator extending longitudinally in a first planar layer of semiconductor material;
said first actuator forming an electrical pathway therethrough, having a relatively high resistance portion and a relatively low resistance portion;
a second actuator extending longitudinally in a second planar layer of semiconductor material;
said second actuator forming an electrical pathway therethrough, the pathway having a relatively high resistance portion and a relatively low resistance portion;
said first and second layers being superposed with one another;
said low resistance portions of said first and second actuators being coupled to one another;
said high resistance portions of said first and second actuators being free of one another;
each of said first and second actuators being configured for selective actuation by selectively conveying electric current therethrough, to generate thermal expansion of the relatively high resistance portions thereof;
wherein common actuation of both said first and second actuators is configured to generate movement of said actuator system within a planar direction; and
wherein actuation of one relative to the other of said first and second actuators is configured to generate controlled movement of said system out of the planar direction.

31. A micro electro-mechanical system (MEMS) actuator assembly comprising:
a thermal actuator extending longitudinally in a first planar layer;
said actuator forming an electrical pathway therethrough;
a member extending longitudinally in a second planar layer;
said first layer and said second layer being parallel to one another;

said actuator and said member being coupled to one another;

said actuator being configured for actuation by selective application of electricity thereto, to generate thermal expansion thereof;

wherein actuation of said actuator is configured to generate controlled movement of said system out of the planar direction; and wherein said actuator has a relatively high resistance portion having a non-uniform transverse cross-section.

32. The actuator assembly of claim 31, wherein:

said actuator includes a first actuator;

said member includes a second actuator configured for actuation by selective application of electricity thereto, to generate expansion thereof;

wherein common actuation of both said first actuator and said second actuator is configured to generate movement of said actuator system within a planar direction; and wherein actuation of one relative to the other of said first actuator and said second actuator is configured to generate controlled movement of said system out of the planar direction.

33. The actuator assembly of claim 32, wherein said first and second actuators each form an electrical pathway extending therethrough, the pathway having a relatively high resistance portion and a relatively low resistance portion, the high resistance portion being configured for thermal expansion upon selective application of electricity thereto.

34. The actuator assembly of claim 31, wherein said actuator extends longitudinally in a first planar layer of semiconductor material.

35. The actuator assembly of claim 32, wherein said second actuator extends longitudinally in a second planar layer of semiconductor material.

36. The actuator assembly of claim 32, wherein said first and second layers are superposed with one another.

37. The actuator assembly of claim 36, wherein said first and second actuators are superposed with one another.

38. The actuator assembly of claim 33, wherein said low resistance portions of said first and second actuators are coupled to one another.

39. The actuator assembly of claim 38, wherein said high resistance portions of said first and second actuators are spaced from one another.

40. The actuator assembly of claim 32, further comprising another of said first actuators.

41. The actuator assembly of claim 40, comprising a plurality of said first actuators and a plurality of said second actuators.

42. The actuator assembly of claim 32, comprising a plurality of electrical contacts coupled to said first and second actuators.

43. The actuator assembly of claim 33, wherein the relatively high resistance portions of the first and second actuators each have a non-uniform transverse cross-section.

44. The actuator assembly of claim 43, wherein the relatively high resistance portions of the first and second actuators each have a transverse cross-section that varies along the length thereof.

45. The actuator assembly of claim 44, wherein the transverse cross-section increases and then decreases along the length of the relatively high resistance portions.

46. The actuator assembly of claim 45, wherein the transverse cross-section is greater at a medial portion than at end portions of the relatively high resistance portions.

47. A method of aligning a first component and a second component to one another, said method comprising:

using a positioner of claim 2;

fastening the first component to the stage;

grounding a second component; and selectively activating at least one of said actuators to effect a change in position of the first component relative to the second component in at least any one of six degrees of freedom.

48. A method of fabricating a positioner, said method comprising:

(a) providing a semiconductor wafer having at least two device layers alternately superposed with at least two oxide layers;

(b) applying a mask layer to the uppermost device layer;

(c) etching exposed portions of the uppermost device layer;

(d) etching exposed portions of the uppermost oxide layer;

(e) removing the mask layer;

(f) applying a metallization layer onto exposed portions of the device layers;

(g) masking portions of the metallization layer, to mask a desired contact area;

(h) etching the metallization layer to remove unwanted portions thereof;

(i) removing the mask from remaining metallization to reveal contact areas;

(j) masking exposed areas of the wafer;

(k) etching exposed portions of the exposed device layer;

(l) etching exposed portions of the exposed oxide layer;

(m) etching exposed portions of exposed device layer;

(n) masking the underside of the wafer and protecting the topside of the wafer;

(o) etching the underside of the wafer to an oxide layer;

(p) applying a vaporized etchant to the wafer to remove exposed portions of oxide layer; and (q) removing the mask.

* * * * *